(12) United States Patent
Ramaswamy (10) Patent No.: US 9,183,445 B2
(45) Date of Patent: Nov. 10, 2015

(54) HEURISTIC METHOD FOR SCENE CUT DETECTION IN DIGITAL BASEBAND VIDEO

(71) Applicant: Tektronix, Inc., Beaverton, OR (US)

(72) Inventor: Krishna Seshadri Ramaswamy, Bangalore (IN)

(73) Assignee: TEKTRONIX, INC., Beaverton, OR (US)

( * ) Notice: Subject to any disclaimer, the term of this patent is extended or adjusted under 35 U.S.C. 154(b) by 82 days.

(21) Appl. No.: 14/063,824

(22) Filed: Oct. 25, 2013

(65) Prior Publication Data

US 2014/0119666 A1   May 1, 2014

(30) Foreign Application Priority Data

Oct. 25, 2012   (IN) .......................... 3101/MUM/2012

(51) Int. Cl.
  *G06K 9/56*   (2006.01)
  *G06K 9/00*   (2006.01)
  *H04N 5/14*   (2006.01)

(52) U.S. Cl.
  CPC ........ *G06K 9/00765* (2013.01); *G06K 9/00711* (2013.01); *H04N 5/147* (2013.01)

(58) Field of Classification Search
  None
  See application file for complete search history.

(56) References Cited

U.S. PATENT DOCUMENTS

| | | | | |
|---|---|---|---|---|
| 5,847,776 | A * | 12/1998 | Khmelnitsky et al. | ........ 348/699 |
| 2005/0123044 | A1 * | 6/2005 | Katsavounidis et al. | 375/240.12 |
| 2006/0109902 | A1 * | 5/2006 | Yu et al. | ................... 375/240.12 |
| 2009/0278672 | A1 * | 11/2009 | Weilkes et al. | ............... 340/435 |
| 2011/0299781 | A1 * | 12/2011 | Schoenblum | ................. 382/195 |

* cited by examiner

*Primary Examiner* — Sumati Lefkowitz
*Assistant Examiner* — David Perlman
(74) *Attorney, Agent, or Firm* — Michael A. Nelson; Marger Johnson (57) ABSTRACT

A video detector for detecting scene changes in a video according to embodiments includes an input for accepting the video, a difference metric calculator for computing a difference metric between two adjacent video frames, and an outlier detector to detect whether an output of the difference metric calculator contains measurements outside of a threshold level of standard deviations of a Gaussian distribution. Methods are also described.

10 Claims, 8 Drawing Sheets

HEURISTIC METHOD FOR SCENE CUT DETECTION IN DIGITAL BASEBAND VIDEO

RELATED APPLICATION

This application claims priority to Indian Patent Application No. 3101/MUM/2012, filed Oct. 25, 2012, titled HEURISTIC METHOD FOR SCENE CUT DETECTION IN DIGITAL BASE BAND VIDEO, which is incorporated by reference.

FIELD OF THE INVENTION

This disclosure is directed toward analysis of video, and, more particularly, to detecting when scene cuts occur in a video stream.

BACKGROUND

A video sequence is made from a set of video frames having a certain temporal distance between the frames. As part of a given 'scene,' the video frames within it have a temporal coherence. Scene cuts are introduced at various points in the video sequence due to a number of factors such as video editing effects, changing camera angles, and artistic effects, etc., as well as due to scene changes themselves.

Figure 1:
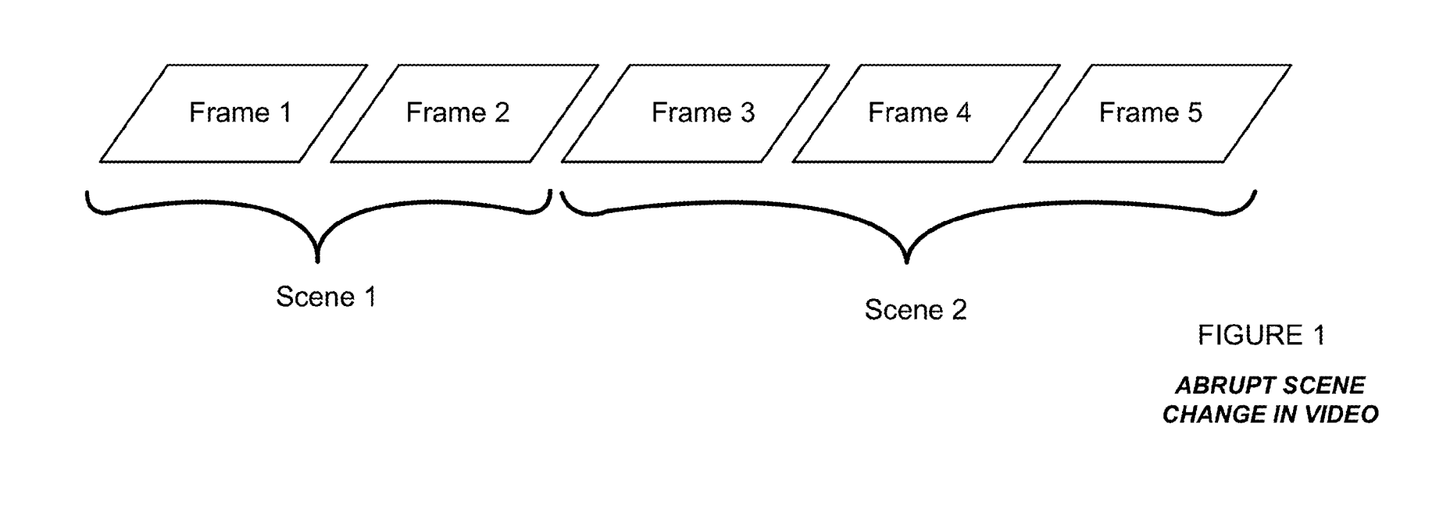
FIG. 1 illustrates a series of video frames that contains two scenes in a video in which the scene change from the first scene to the second scene is abrupt.

FIG. 1 illustrates a series of video frames that contains two scenes in a video in which the scene change from the first scene to the second scene is abrupt. In an abrupt scene change, the frames on either side of the scene changes are completely different. For example a first scene of a video may be a person approaching a building from the outside, then the video changes scenes to a view of the person entering the building from the inside. In this instance, the last frame of the first scene and the first frame of the second scene are radically different. Other scene changes happen gradually over a number of video frames. These gradual scene changes may include fades, wipes, dissolves, etc. Embodiments of the invention are directed to the former types of scene changes.

Several approaches exist for detecting scene changes, but they may be broadly classified into one of two categories—those that analyze compressed video streams and those that analyze uncompressed video streams. The latter type is also called analysis in the uncompressed pixel domain, and is the category to which the invention is directed.

One popular method of detecting scene changes in uncompressed video streams is to use an intensity histogram. In this method the histogram difference between two consecutive video frames is computed. This difference is then compared against a threshold to decide whether a scene cut occurred between the two frames. A potential drawback of such an approach is how to choose the threshold. Sometimes a global threshold applied to all of the frames across a video sequence would yield better results, but other times a local threshold would be better. Another possible limitation with the histogram approach is that it has difficulty detecting between two images that have different structure but similar pixel values.

Embodiments of the invention address these and other limitations of the prior art.

SUMMARY OF THE INVENTION

Some aspects of the invention include methods for detecting scene changes in an video that may include a number of different scenes. One such method includes accepting at least two frames of video at a video input and computing a difference metric between two adjacent video frames. Next the method detects whether an output of the difference metric calculator contains measurements outside of a threshold level of standard deviations of a Gaussian distribution. When such outliers exist, the method indicates the video as having a scene change. The difference metric may include root mean squared error, for example. The method may also include outlier detection to verify that a pair of outliers is based on data from the same element in at least one same-sized sliding window.

Other aspects of the invention include a video detector for detecting scene changes in a video that may include a number of different scenes, in which the video includes a plurality of frames each made from individual pixels. Such a video detector includes an input for accepting the video, a difference metric calculator for computing a difference metric between two adjacent video frames, and an outlier detector to detect whether an output of the difference metric calculator contains measurements outside of a threshold level of standard deviations of a Gaussian distribution. Once calculated, an identifier of the video detector indicates the video as having a scene change based on an output of the outlier detector.

DETAILED DESCRIPTION

Embodiments of the invention use statistical modeling to detect scene changes in a video. Difference metrics are calculated between two consecutive video frames, then the data of the metric is statistically analyzed to seek outliers. If outliers exist, it is likely that the frames used to calculate the metric are from different scenes. Variations of the method are used to decrease the probability of false positive results.

One difference metric is root mean squared error (RMSE). In this embodiment an RMSE is calculated for the luminance component of two adjacent frames represented in YUV format, which is a format often found in streaming video that enhances luminance values over chrominance values.

An RMSE formula is set forth below as:
RMSE=Square Root (MSE), where
MSE=$\Sigma(N_x-(n-1)_x * (N_x-(N-1)_x)$/Number of pixels in image
where
$N_x$ is the pixel x of the luma component in frame N;

(n−1)$_x$ is the pixel x of the luma component in frame N−1; and x ranges from 0 to (frame_luma_width*frame_luma_height)

The statistical behavior exhibited by the RMSE values, over a sliding window, approximates a Gaussian distribution, with most of the values centered around the mean, and several within one standard deviation from the mean.

Figure 2:
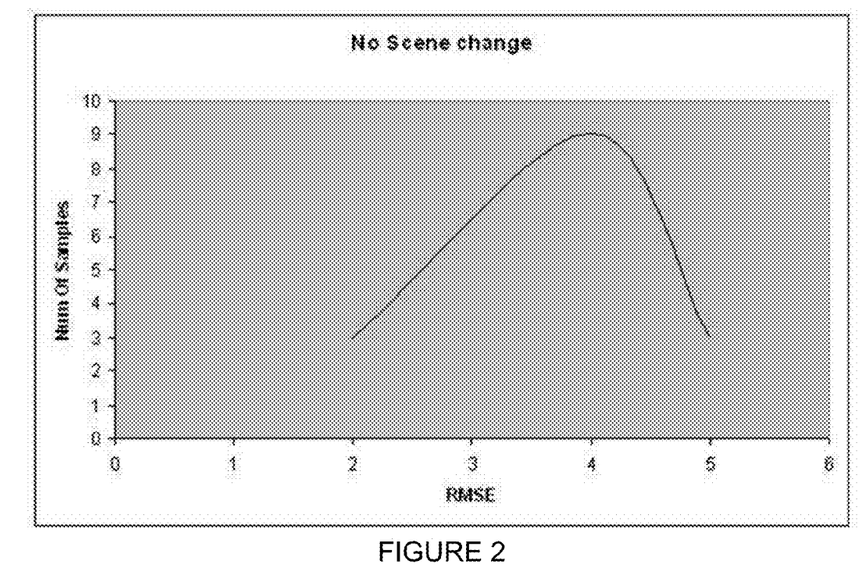
FIG. 2 illustrates a the behavior of the difference metric between adjacent frames, in an interval of frames with no scene cut, used by embodiments of the invention.
Figure 3:
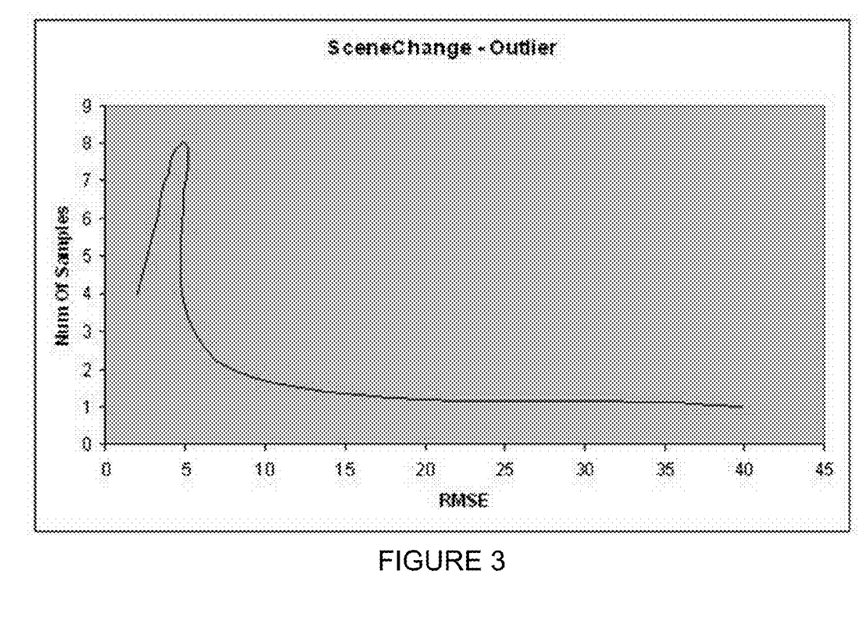
FIG. 3 illustrates a illustrates the behavior of the difference metric between adjacent frames, in an interval of frames with one scene cut, used by embodiments of the invention.

FIG. 2 illustrates this behavior. FIG. 2 is a plot of RMSE values plotted against the number of samples for a test video sequence that has no abrupt scene cuts. By using the known property that 95% of the samples of a distribution exhibiting Gaussian properties lies within two standard deviations from the mean, it may be assumed that anything that lies outside of two standard deviations from the mean of an RMSE distribution may be considered a potential outlier. FIG. 3 illustrates a plot of RMSE values for a video test sequence that has an abrupt scene cut. It is evident in FIG. 3 that, while most samples are centered around the mean, there is one outlier having an RMSE value of approximately 40, which is approximately 8 times away from the mean. This outlying RMSE value corresponds to a scene cut at that frame, which was confirmed by manual inspection.

Embodiments of the invention, therefore, detect outliers in a difference metric, such as RMSE samples for a specified window size. One such statistical method is Huber's method, detailed in AMC Technical Brief, No. 6, Apr. 2001, entitled "Robust Statistics: a method of coping with outliers," which is incorporated by reference herein.

Sometimes, however, effects such as camera pan or zoom, appearance of text captions, or a few dropped frames between two consecutive frames of a video sequence can also produce a spike in RMSE values. Without error detection, these RMSE spikes would be categorized as outliers, and therefore falsely as scene cuts. To minimize such a possibility of false attributions, embodiments of the invention include a block matching method described below.

Figure 4A:
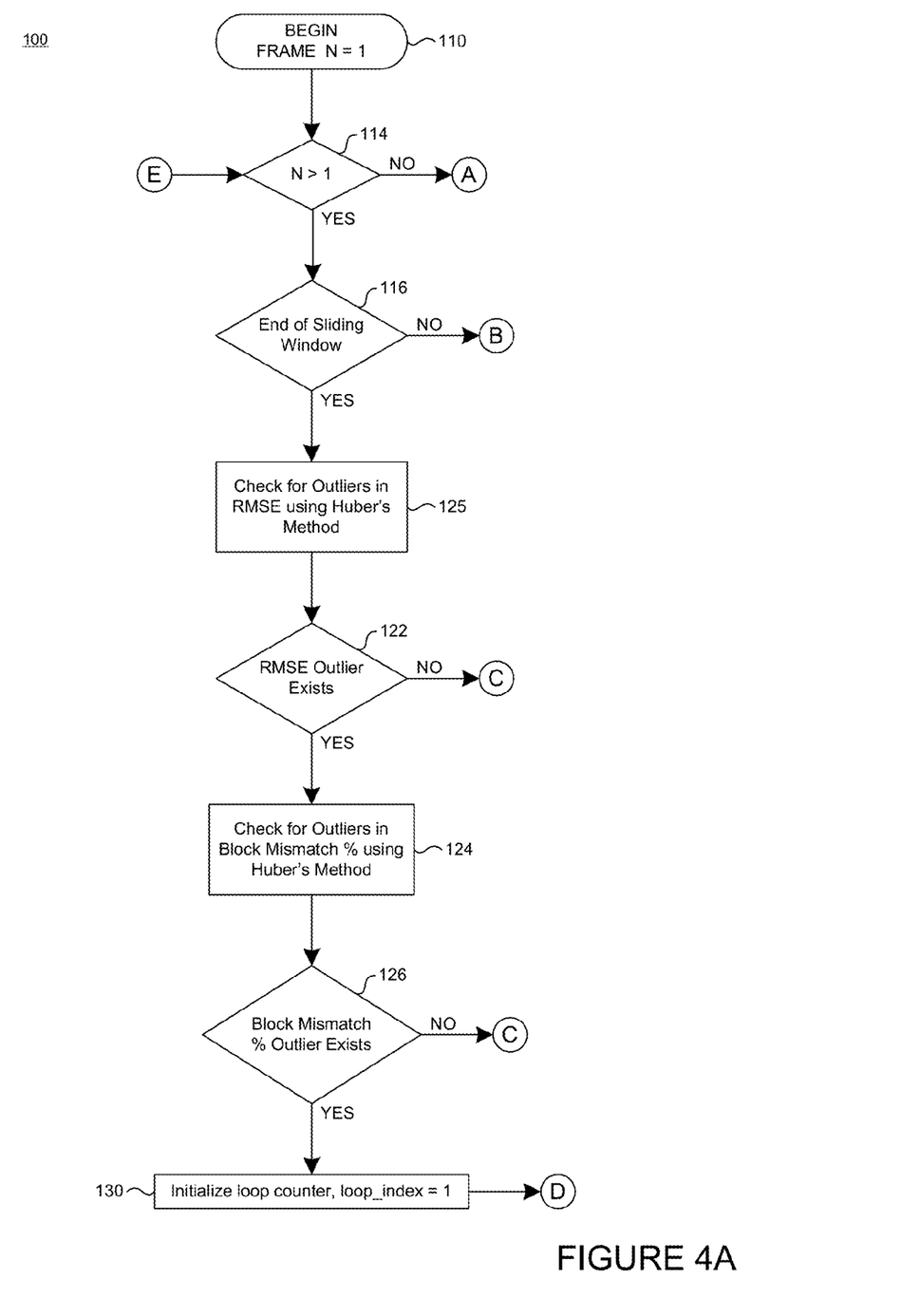
FIGS. 4A, 4B, and 4C together make a flowchart illustrating an example method of detecting scene cuts in a video according to embodiments of the invention.
Figure 4B:
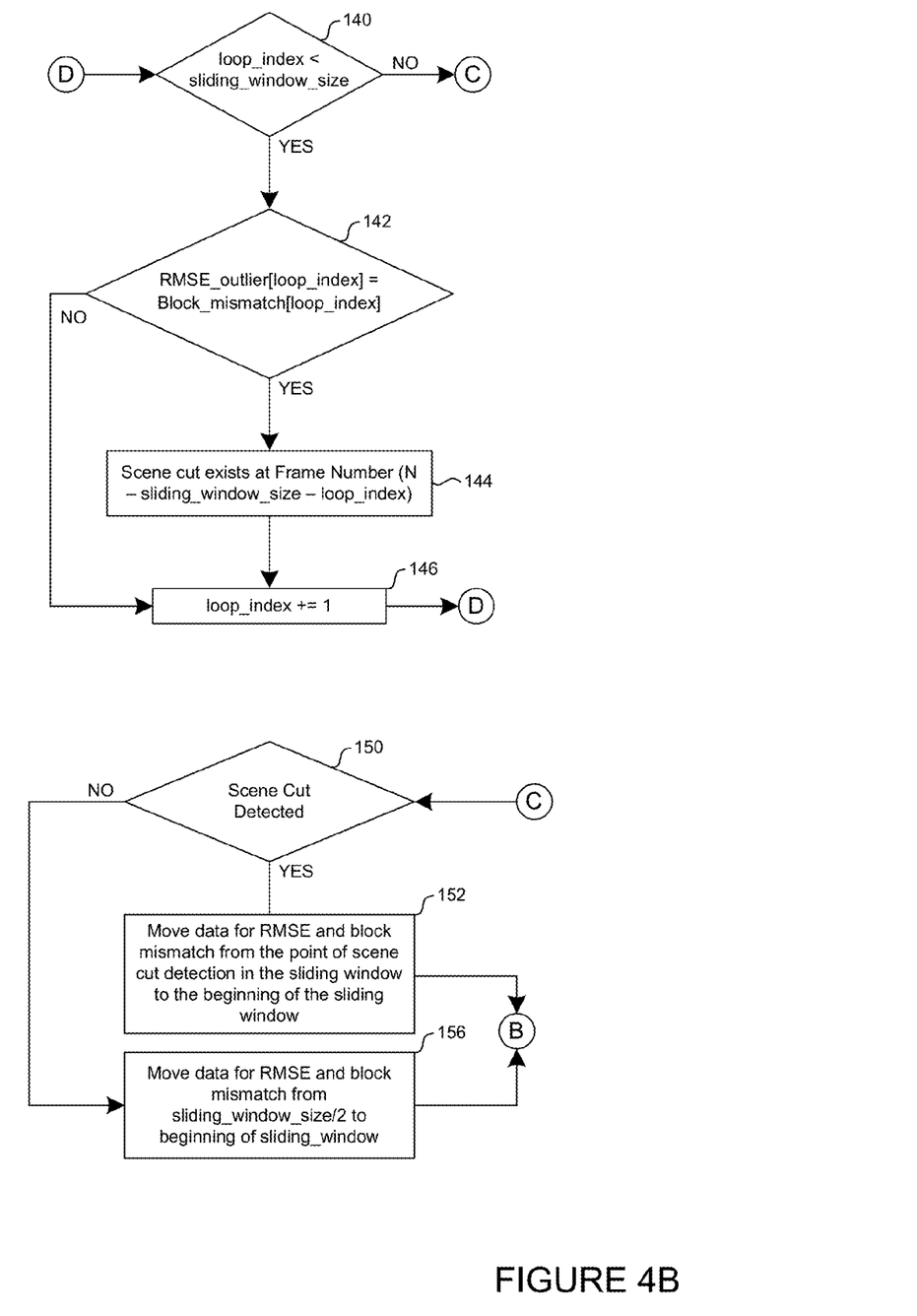
Figure 4C:
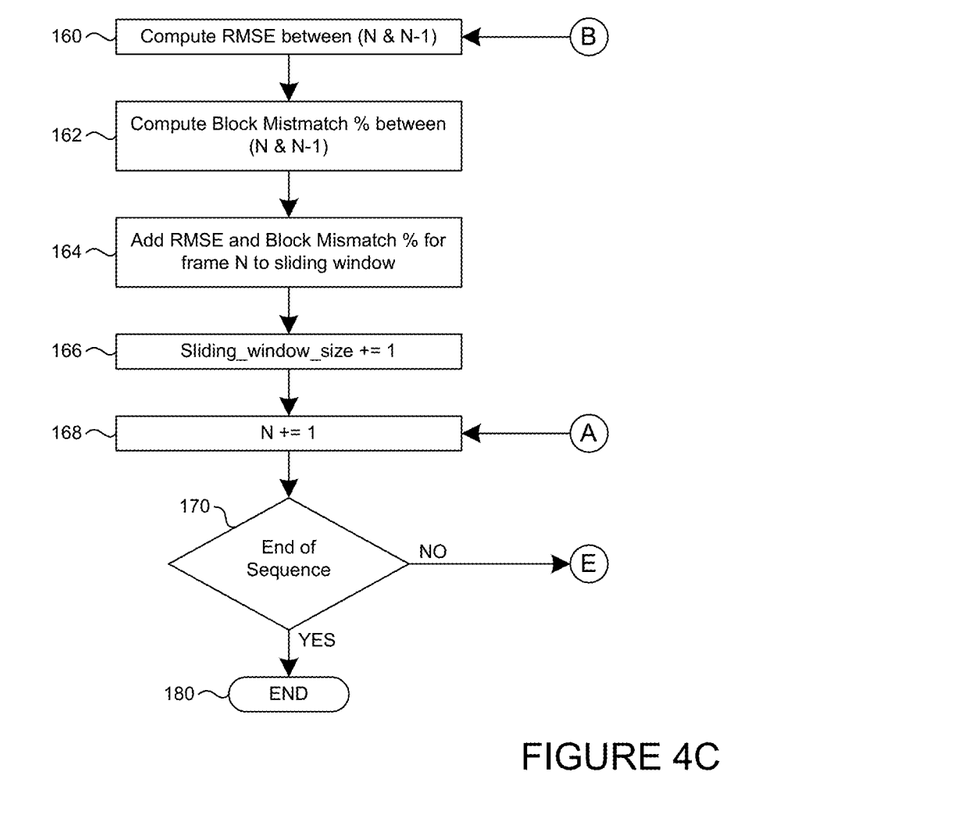

FIGS. 4A-4C illustrate an example method according to embodiments. A flow 100 begins at a first frame of a video sequence in an operation 110. A decision operation 114 checks to see if the current frame is at least the second frame in the video sequence. Since the first frame is not at least the second frame, the decision operation 114 initially exits in the NO direction, and the flow 100 proceeds to operation 168 (FIG. 4C) where the next frame in the video sequence is acquired. Because the end of the video sequence has not yet been reached, the decision operation 170 exits in the NO direction, and the flow 100 loops back to the operation 114 (FIG. 4A).

The flow then proceeds to an operation 116, where a decision operation determines if the end of the sliding window has been reached, described below. The size of the sliding window may be user specified. Assuming the end of the sliding window has not been reached, the operation 116 exits in the NO direction, and the flow 100 continues at a process 160 (FIG. 4C), where the RMSE difference metric is computed between the frames N and N−1.

Figure 5:
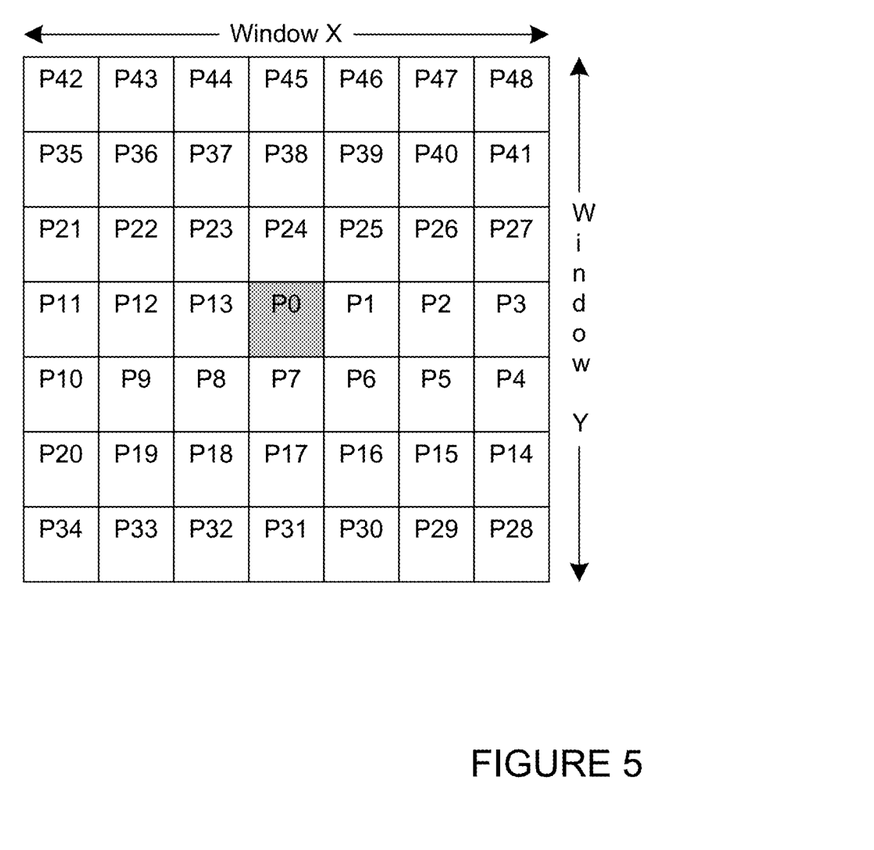
FIG. 5 is an example window size used by the block matching method for the false alarm detector according to embodiments of the invention.
Figure 6:
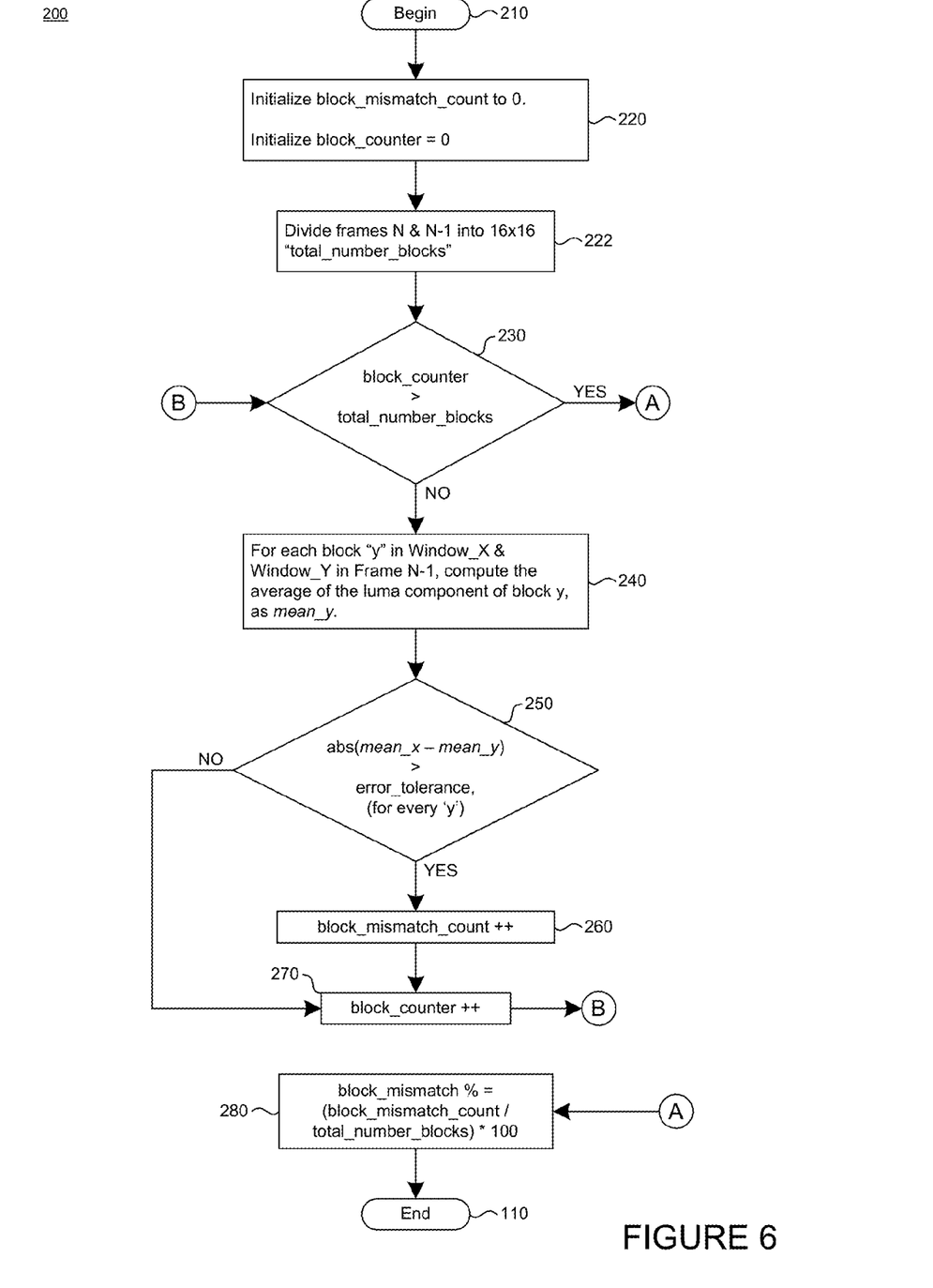
FIG. 6 is a flowchart illustrating an example method of detecting false alarms for scene cuts in a video, according to embodiments of the invention.

An operation 162 then computes a block mismatch percentage between the frames N and N−1, which is described in detail with reference to FIGS. 5 and 6 below.

Next, the flow 100 proceeds to an operation 164, which combines the RMSE and block mismatch percentage calculated in operations 160 and 162, respectively, and the sliding window size is increased by 1.

The flow 100 then selects the next frame in the video sequence in the operation 168. If the decision operation 170 determines that the last frame in the video sequence has not been reached, then the flow 100 repeats again at the process 114.

With reference back to operation 116 (FIG. 4A), if instead the end of the sliding window has been reached, then the flow 100 exits the decision operation 116 in the YES direction. Then outliers are determined using a statistical method such as Huber's method described above in an operation 120. If such an outlier exists, the decision operation 122 exits in the YES direction and outliers are determined in the block mismatch percentage, again using Huber's method in an operation 124.

If such outliers exist in the block mismatch percentage, then the flow 100 continues to an operation 130, which begins a sequence to check for a false positive scene detection.

To check for such a false positive, first a decision operation 140 (FIG. 4B) checks to see if the loop index is less than the size of the sliding window. Because for the first time through this branch the loop index is necessarily less than the sliding window size, the decision operation 140 exits in the YES direction. A decision operation 142 then verifies that both outliers in the RMSE and the block mismatch percentage outlier are pointing to the same element in the sliding window. If so, then the decision operation 142 exits in the YES direction and it is determined that the scene cut exists at frame number N-sliding_window_size—loop index). The loop index is then incremented in an operation 146, and the branch continues back at operation 140 until the loop index equals the size of the sliding window.

When the loop index equals the size of the sliding window, the flow 100 continues to a decision operation 150. If the scene cut was detected in the operation 144, the decision operation 150 exits in the YES direction, and data for the RMSE and the bock mismatch is moved from the point of the scene cut detection in the sliding window to the beginning of the sliding window in an operation 152, and the flow 100 continues at operation 160 (FIG. 4C). If instead no scene cut was detected in the operation 144, then the decision operation 150 exits in the NO direction, and the sliding window statistics for both the RMSE and the block mismatch are moved from ½ of the sliding window size to the beginning of the sliding window, and again the flow 100 continues at operation 160 (FIG. 4C).

The block matching method referred to in operation 162 (FIG. 4C) is described below with reference to FIGS. 5 and 6. in these figures:

P0 is the co-located block of the current block in Frame (N−1);

P0:P48 are the blocks in Frame (N−1) against which the current block is matched; and Window X and Window Y are user configurable sizes of the matching window.

An outline of the block match method is now described with reference to a flow 200 in FIG. 6. After an initialization operation 220, frames N and N−1 are divided into a number of two-dimensional 16×16 blocks, for example, in an operation 222. Also, although not illustrated, for each block 'x' in frame N, the mean of the luma component for block x is computed as mean x.

Then, so long as the block counter has not reached the last block in decision operation 230, for each block 'y' in the Window X*Window Y in frame (N−1), a mean luma component for block y is computed as mean y, and compared to mean x, in an operation 240. In a decision operation 250, if mean x is outside the error tolerance range, such as five units of every mean y, then a block mismatch count is incremented in an operation 260. Then the block counter is incremented as well in an operation 270.

Finally, after each block y has been so evaluated for every block x, a block mismatch percentage is calculated in an operation 280 as the (block mismatch count/total number of blocks)*100.

A refinement of the block matching method includes using block sizes different than 16×16 in the operation 122. Also, the mean values of the overlapping neighboring blocks could be stored so that the mean does not have to be calculated in every block.

Figure 7:
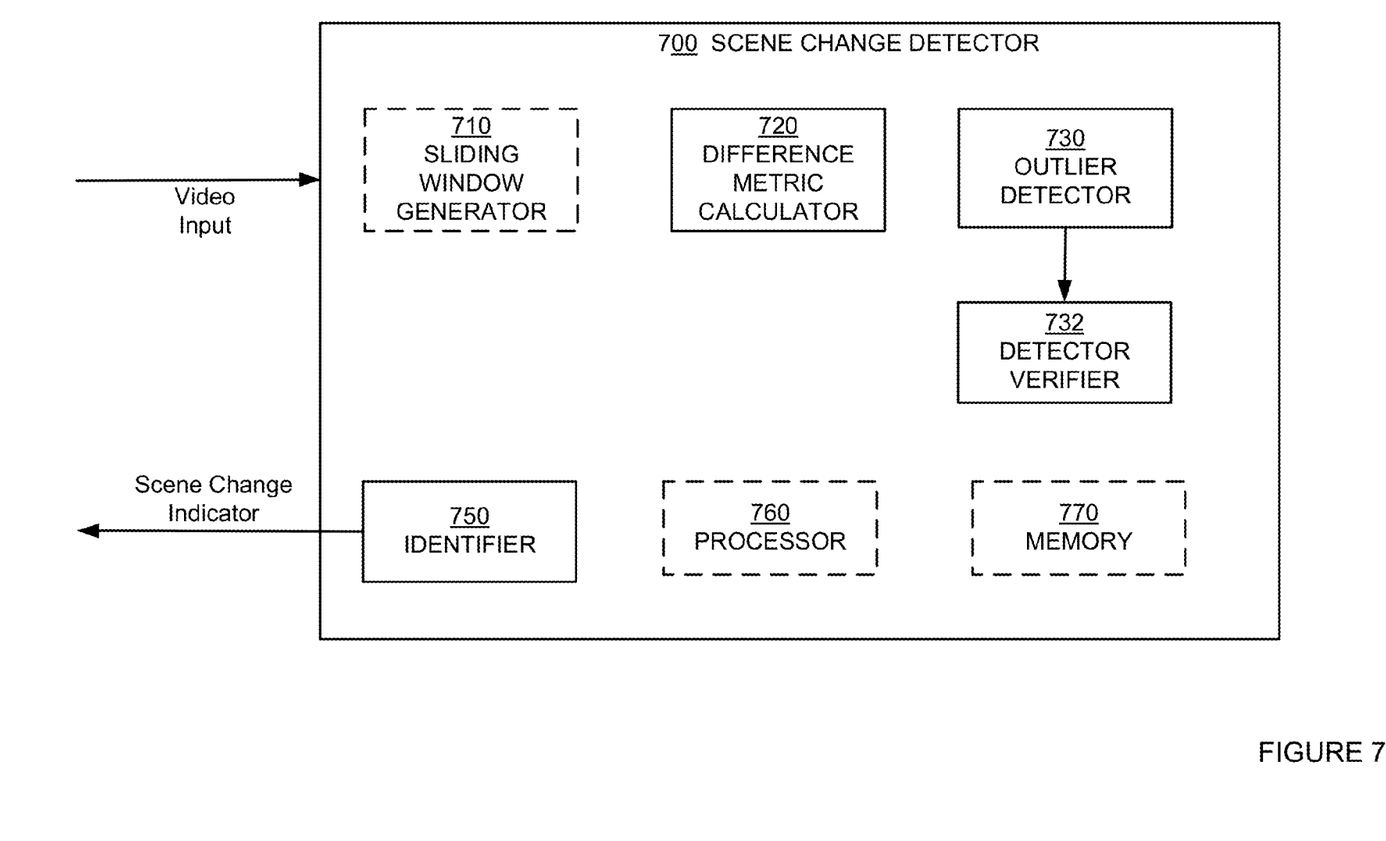
FIG. 7 is a block diagram illustrating components of a video detector structured to identify scene cuts of a video according to embodiments of the invention.

A scene change detector for detecting scene changes in a video that may include a number of different scenes may include elements as illustrated in FIG. 7. In FIG. 7, a scene change detector 700 includes an input for accepting the video. A difference metric calculator 720 is used to compute a difference metric of a luma component between two adjacent video frames as described above with reference to FIGS. 4A-4C. In some embodiments the difference metric calculator may calculate a root mean squared error between the two adjacent video frames.

The scene change detector 700 also includes an outlier detector 730 to detect whether an output of the difference metric calculator 720 contains measurements outside of a threshold level of standard deviations of a Gaussian distribution. An identifier 750 may then indicate the video as having a scene change based on an output of the outlier detector, and further may indicate the location of the scene change.

The scene change detector 700 may also include an outlier detector verifier 732 structured to verify that a pair of outliers is based on data from the same element in at least one same-sized sliding window. This reduces the chance of falsely labeling a scene change when there actually is no scene change.

The scene change detector 700 may also include a block mismatch calculator structured to compare a block of a first of the two adjacent frames to a set of blocks of a second of the two adjacent frames, and in some embodiments the block mismatch calculator is structured to operate on various sized blocks. Any of the functions illustrated in the functional block diagram of FIG. 7 may be implemented by a processor 760, and may be stored in related memory 770.

What is claimed is:

1. A video detector for detecting scene changes in a video that may include a number of different scenes, the video including a plurality of adjacent video frames each made from individual pixels, the detector comprising:
    an input for accepting the video;
    a difference metric calculator for computing a difference metric between pairs of adjacent video frames in the plurality of adjacent video frames;
    a block mismatch calculator configured to compare each of a plurality of two-dimensional blocks of one of the pairs of adjacent frames to a set of corresponding blocks of a plurality of two-dimensional blocks of a second of the pairs of adjacent frames, the block mismatch calculator further configured to compute, for the pairs of adjacent frames, a percentage of block mismatch based on the comparisons and a total number of blocks in the first of the pairs of adjacent frames;
    an outlier detector configured to identify a Gaussian distribution for the computed difference metrics and to identify a Gaussian distribution for the computed percentages of block mismatch, the outlier detector also configured to detect whether a difference metric outlier exists, the difference metric outlier existing when one of the computed difference metrics is outside of a threshold level of standard deviations of the Gaussian distribution for the computed difference metrics, the outlier detector further configured to detect whether a block mismatch outlier exists, the block mismatch outlier existing when one of the computed percentages of block mismatch is outside of a threshold level of standard deviations of the Gaussian distribution for the computed percentages of block mismatch; and
    an identifier structured to indicate the video as having a scene change when both a difference metric outlier exists and a block mismatch outlier exists.

2. The video detector for detecting scene changes according to claim 1 in which the difference metric calculator calculates a root mean squared error between the pairs of adjacent video frames.

3. The video detector for detecting scene changes according to claim 2 in which the plurality of adjacent video frames are represented in YUV format and in which the difference metric calculator calculates a root mean squared error for a luminance component of the pairs of adjacent video frames.

4. The video detector for detecting scene changes according to claim 1, further comprising an outlier detector verifier structured to verify that the difference metric outlier and the block mismatch outlier are based on data from the same pair of adjacent video frames.

5. The video detector for detecting scene changes according to claim 1, in which the set of corresponding blocks of the second of the pairs of adjacent frames is configurable.

6. A method for detecting scene changes in an video that may include a number of different scenes, the method comprising:
    accepting, at a video input, a video having a series of adjacent video frames;
    dividing each video frame into a plurality of two-dimensional blocks;
    computing a difference metric between each pair of adjacent video frames in the series of adjacent video frames;
    identifying a Gaussian distribution for the computed difference metrics;
    detecting whether a difference metric outlier exists, the difference metric outlier existing when one of the computed difference metrics is outside of a threshold level of standard deviations of the Gaussian distribution for the computed difference metrics;
    comparing each of the plurality of blocks of a first of each pair of adjacent frames to a set of corresponding blocks of the plurality of blocks of a second of each pair of adjacent frames;
    computing, for each pair of adjacent frames, a percentage of block mismatch based on the comparing and a total number of blocks in the first of each pair of adjacent frames;
    identifying a Gaussian distribution for the computed percentages of block mismatch;
    detecting whether a block mismatch outlier exists, the block mismatch outlier existing when one of the computed percentages of block mismatch is outside of a threshold level of standard deviations of the Gaussian distribution for the computed percentages of block mismatch; and
    indicating the video as having a scene change when both a difference metric outlier exists and a block mismatch outlier exists.

7. The method for detecting scene changes according to claim 6, in which computing a difference metric between each pair of adjacent video frames comprises calculating a root mean squared error between each pair of adjacent video frames.

8. The method for detecting scene changes according to claim 6 in which the series of adjacent video frames is represented in YUV format and in which computing a difference metric between each pair of adjacent video frames comprises calculating a root mean squared error for a luminance component of each pair of adjacent video frames.

9. The method for detecting scene changes according to claim 6, further comprising, before indicating the video as having a scene change, verifying that the difference metric outlier and the block mismatch outlier are based on data from the same pair of adjacent video frames.

10. The method for detecting scene changes according to claim 6, in which the set of corresponding blocks of the second of each pair of adjacent frames is configurable.

* * * * *